United States Patent
Rosu et al.

(10) Patent No.: US 12,392,863 B2
(45) Date of Patent: Aug. 19, 2025

(54) FREQUENCY-MODULATED CONTINUOUS-WAVE (FMCW) RADAR INTERFERENCE MITIGATION USING AN AUTOREGRESSIVE MOVING AVERAGE (ARMA) MODEL

(71) Applicant: NXP USA, INC., Austin, TX (US)

(72) Inventors: Filip Alexandru Rosu, Bucharest (RO); Cristian Savlovschi, Bucharest (RO); Tudor Bogatu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 484 days.

(21) Appl. No.: 17/933,928

(22) Filed: Sep. 21, 2022

(65) Prior Publication Data
US 2023/0408632 A1    Dec. 21, 2023

(30) Foreign Application Priority Data
Jun. 15, 2022   (RO) ............................. a 2022 00336

(51) Int. Cl.
*G01S 7/02*    (2006.01)
*G01S 13/32*   (2006.01)
*G01S 13/58*   (2006.01)

(52) U.S. Cl.
CPC ............ *G01S 7/0235* (2021.05); *G01S 13/32* (2013.01); *G01S 13/584* (2013.01)

(58) Field of Classification Search
CPC ........ G01S 7/023; G01S 7/354; G01S 13/931; G01S 7/356; G01S 7/4056
See application file for complete search history.

(56) References Cited

U.S. PATENT DOCUMENTS

| | | | | |
|---|---|---|---|---|
| 6,452,665 B1* | 9/2002 | Kikuchi | ............... | G01S 17/931 342/91 |
| 6,633,658 B1* | 10/2003 | Dabney | ............... | G01S 7/52046 382/128 |
| 11,906,654 B2* | 2/2024 | Nugraha | ............ | G01S 13/5246 |
| 2015/0260828 A1* | 9/2015 | Ossowska | ............. | G01S 13/931 342/162 |
| 2015/0301157 A1* | 10/2015 | Ossowska | ............... | G01S 7/023 342/173 |

(Continued)

OTHER PUBLICATIONS

Muhammad Rameez, Interference Mitigation Techniques in FMCW Automotive Radars; 2020; Blekinge Institute of Technology Licentiate Dissertation Series No. 2020:03; Ph. D. Dissertation, 86 pgs., included in IDS filed Sep. 21, 2025 (Year: 2020).*

(Continued)

*Primary Examiner* — William Kelleher
*Assistant Examiner* — Juliana Cross

(57) ABSTRACT

Systems and methods for mitigating interference in Frequency-Modulated Continuous-Wave (FMCW) radars using an Autoregressive Moving Average (ARMA) model are described. In an illustrative, non-limiting embodiment, a device includes a processor and a memory coupled to the processor, the memory having program instructions stored thereon that, upon execution by the processor, cause the device to: receive a first frame captured by a radar; receive a second frame, captured after the first frame, by the radar; and reconstruct zeroed samples in the second frame with information obtained from the first frame to mitigate interference in the second frame caused by another radar.

19 Claims, 16 Drawing Sheets

(56) References Cited

U.S. PATENT DOCUMENTS

| | | | |
|---|---|---|---|
| 2018/0356495 A1* | 12/2018 | Moss | G01S 7/021 |
| 2020/0191911 A1* | 6/2020 | Meissner | G01S 13/343 |
| 2021/0025970 A1* | 1/2021 | Sahara | G01S 13/931 |
| 2021/0389416 A1* | 12/2021 | Hong | G01S 7/0235 |
| 2022/0163660 A1* | 5/2022 | Gulati | G01S 13/343 |
| 2025/0076452 A1* | 3/2025 | Wei | G01S 7/023 |

OTHER PUBLICATIONS

Rameez, et al., "Autoregressive Model-Based Signal Reconstruction for Automotive Radar Interference Mitigation," in IEEE Sensors Journal, vol. 21, No. 5, Mar. 1, 2021, pp. 6575-6586.

Neemat, et al., "An Interference Mitigation Technique for FMCW Radar Using Beat-Frequencies Interpolation in the STFT Domain," in IEEE Transactions on Microwave Theory and Techniques, vol. 67, No. 3, Mar. 2019, pp. 1207-1220.

Rosu, et al., "Multiaperture Focusing for Spaceborne Transmitter/Ground-Based Receiver Bistatic SAR," in IEEE Journal of Selected Topics in Applied Earth Observations and Remote Sensing, vol. 13, Sep. 2022, pp. 5823-5832.

M. Kunert, "The EU project MOSARIM: A general overview of project objectives and conducted work," 2012 9th European Radar Conference, 2012, pp. 1-5.

Uysal, et al., "Mitigation of automotive radar interference," 2018 IEEE Radar Conference (RadarConf18), 2018, pp. 0405-0410.

Muhammad Rameez, "Interference Mitigation Techniques in FMCW Automotive Radars", Blekinge Institute of Technology, Ph.D. Dissertation, 2020, 86 pages.

\* cited by examiner

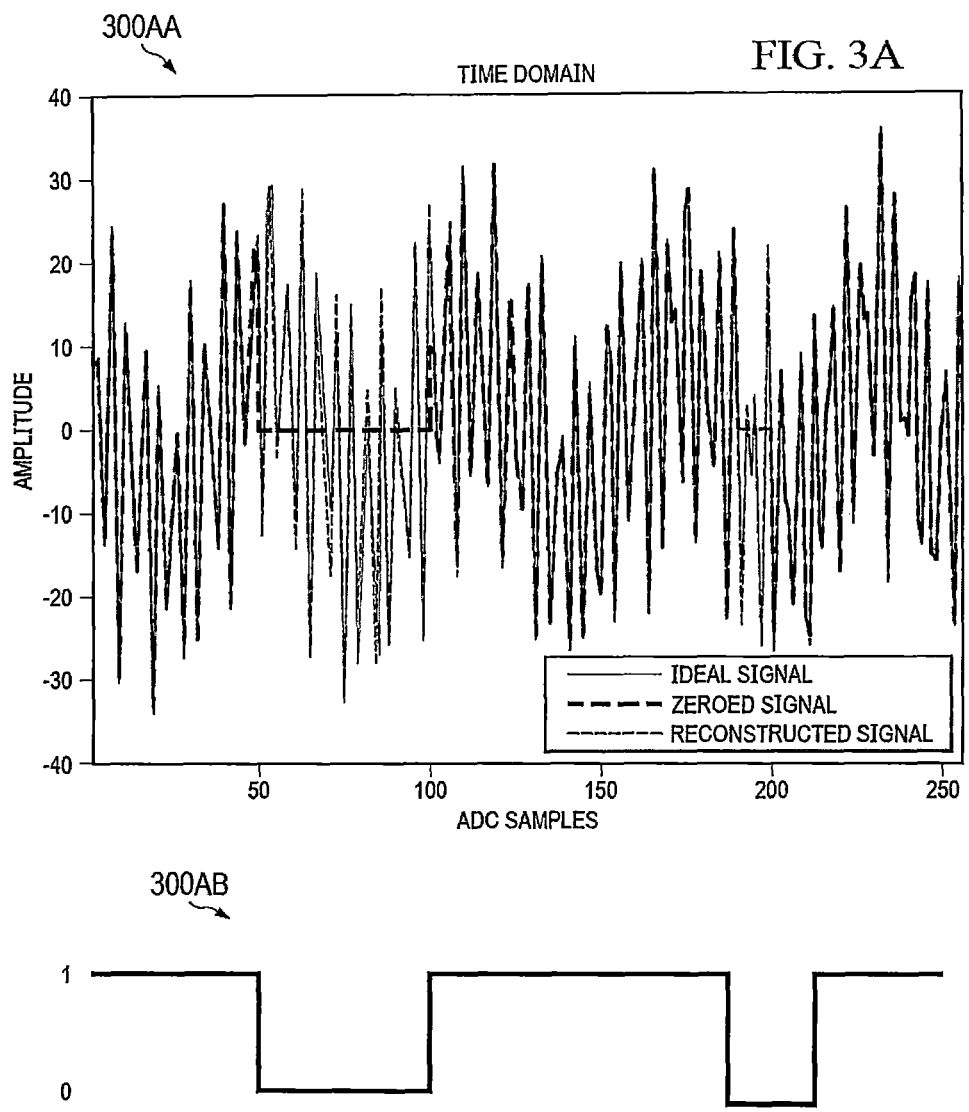

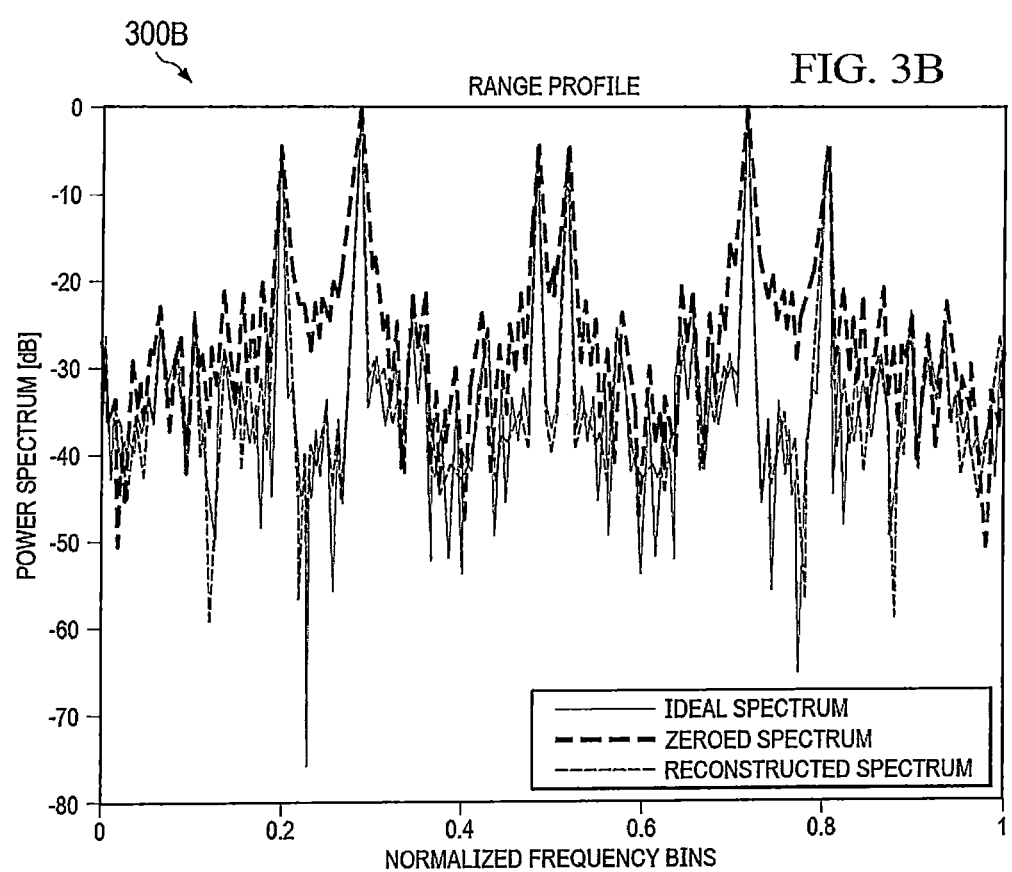

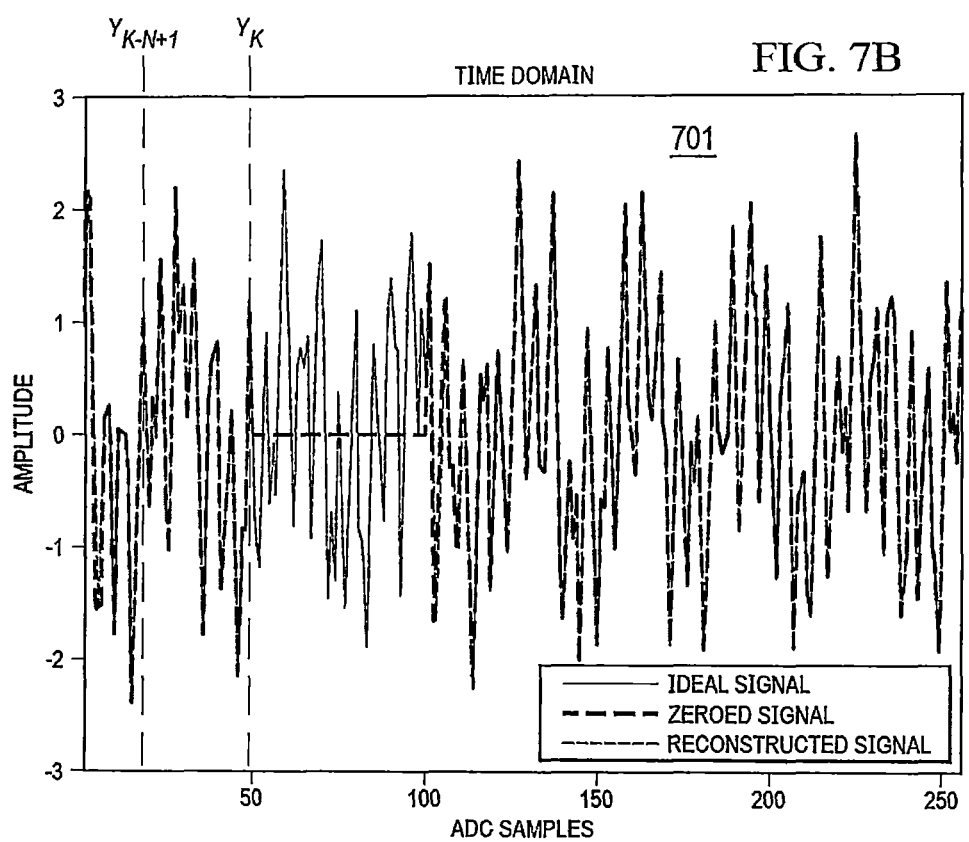

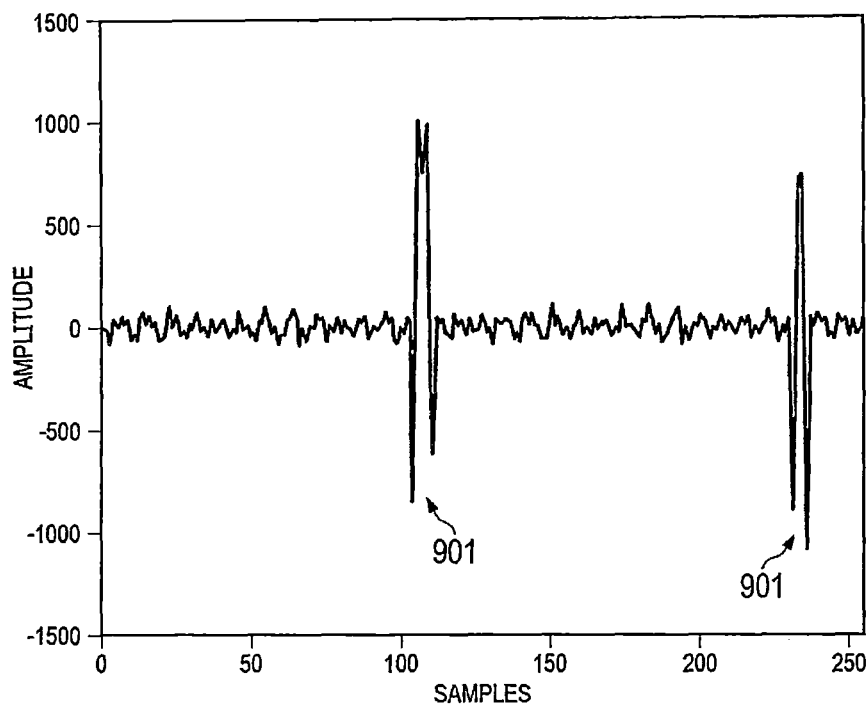
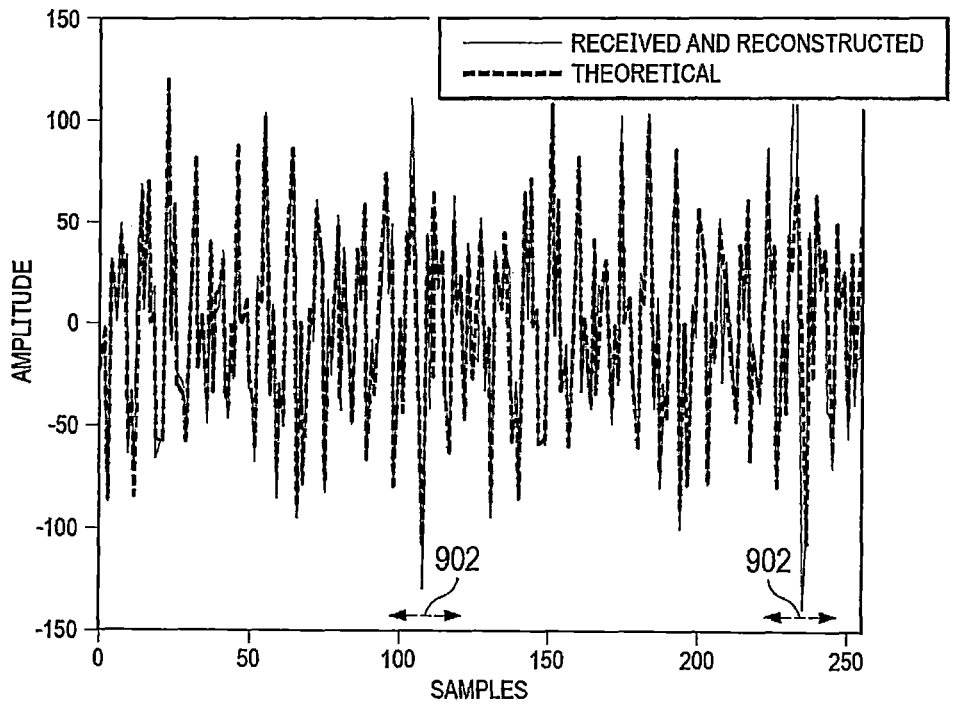

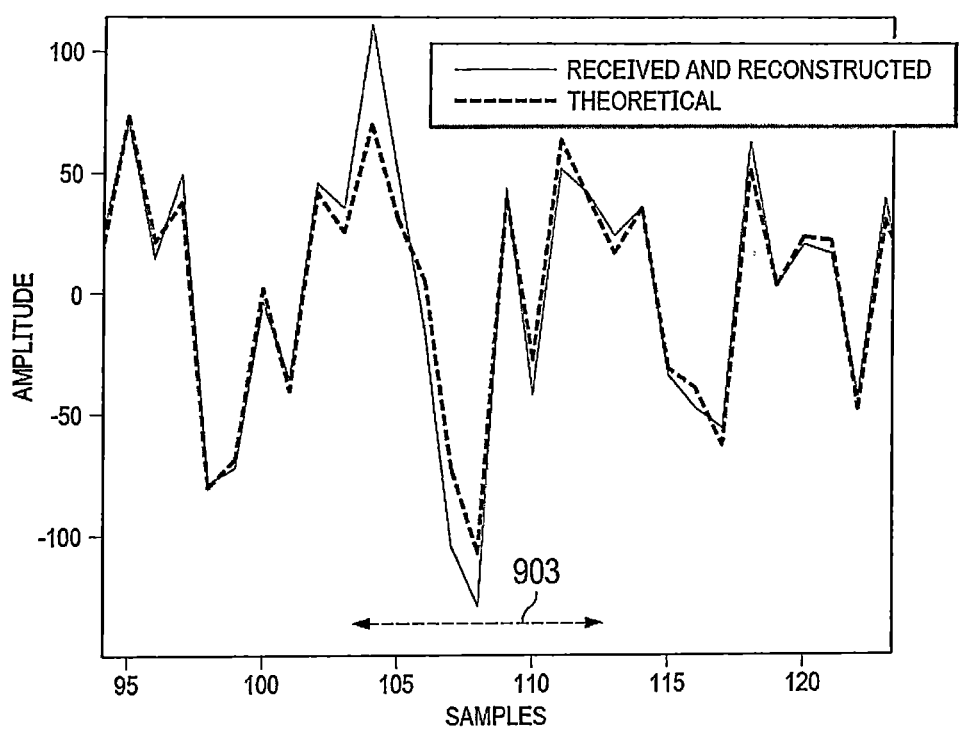

FREQUENCY-MODULATED CONTINUOUS-WAVE (FMCW) RADAR INTERFERENCE MITIGATION USING AN AUTOREGRESSIVE MOVING AVERAGE (ARMA) MODEL

CROSS-REFERENCE TO RELATED APPLICATIONS

This application claims the priority under 35 U.S.C. § 119 of Romania patent application no. a 2022 00336, filed Jun. 15, 2022 the contents of which are incorporated by reference herein.

FIELD

This disclosure relates generally to wireless ranging and localization, and more specifically, to systems and methods for mitigating interference in Frequency-Modulated Continuous-Wave (FMCW) radars using an Autoregressive Moving Average (ARMA) model.

BACKGROUND

Radio Detection and Ranging (radar) systems may be utilized in a variety of applications. Generally, the distance traveled by a radar signal may be used to characterize its environment. For example, a round-trip distance traveled by a radar signal from its transmitter to an object and back to a receiver, as reflected by the object, may be determined based upon characteristics of the signal and of the propagation medium.

In automotive applications, a car may employ one or more radars to ascertain the distance, position, and velocity of nearby vehicles, pedestrians, and other objects. In various implementations, automotive radars may be part of an Advanced Driver-Assistance System (ADAS) configured to detect obstacles around a car in real-time, thus improving driving efficiency and safety. For example, in various implementations, ADAS radars may be used for: automotive night vision, Adaptive Cruise Control (ACC), collision avoidance, Blind Spot Detection (BSD), Autonomous Emergency Braking (AEB), Lane Change Assistance (LCA), intersection assistance, pedestrian protection, parking assistance (PA), etc.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 3A and 3B show a relationship between a timed-domain signal with zeroed samples and a corresponding range profile, according to various embodiments.

FIGS. 7A and 7B show an example implementation of an extrapolation method for an ARMA model, according to various embodiments.

FIGS. 9A-C show graphs of examples of simulation results, according to various embodiments.

DETAILED DESCRIPTION

In the automotive industry, radar interference has become a serious concern, as more and more automobiles now come equipped with Advanced Driver-Assistance Systems (ADAS). The term "interference," as used herein, refers to an unwanted signal(s) (or "noise") that originates from an external source. For example, interference affecting the radar of a first motor vehicle may be caused by the operation of another radar of a second motor vehicle located nearby. In many situations, interference may prevent a radar from detecting a target object, or estimating the target object's position, range, or velocity.

The ability of a radar system to overcome unwanted signals defines its signal-to-noise ratio (SNR). To counter interference, mitigation techniques may be classified into one of three types: (a) interference avoidance, (b) interference estimation and cancellation, or (c) interference suppression and signal reconstruction. In various embodiments, systems and methods described herein may include techniques of the (c) type, also referred to as "detect and repair".

Particularly, these techniques may involve identifying radar samples affected by interference and eliminating, removing, or zeroing them. The missing samples are reconstructed in time domain to avoid the spurious lobes and phase errors that would otherwise be caused by discontinuities. In some cases, an Autoregressive Moving Average (ARMA) model may be employed to perform the reconstruction.

An ARMA model, as described herein, provides a description of a stationary stochastic process using two polynomials, one for an autoregressive (AR) section of the ARMA model, and another for a moving average (MA) section of the ARMA model. Given a time series of data (e.g., received radar samples), an ARMA model may be used as a tool for understanding and predicting future values in the series. AR involves regressing the variable on its own past values, and MA involves modeling an error term as a linear combination of terms occurring contemporaneously and at various times in the past.

In various embodiments, such an ARMA model may be used to reconstruct zeroed samples from a current radar frame using information from a previous radar frame for the purpose of interference mitigation. In other implementations, two or more previous frames may be used to reconstruct zeroed samples in a current frame.

Figure 1:
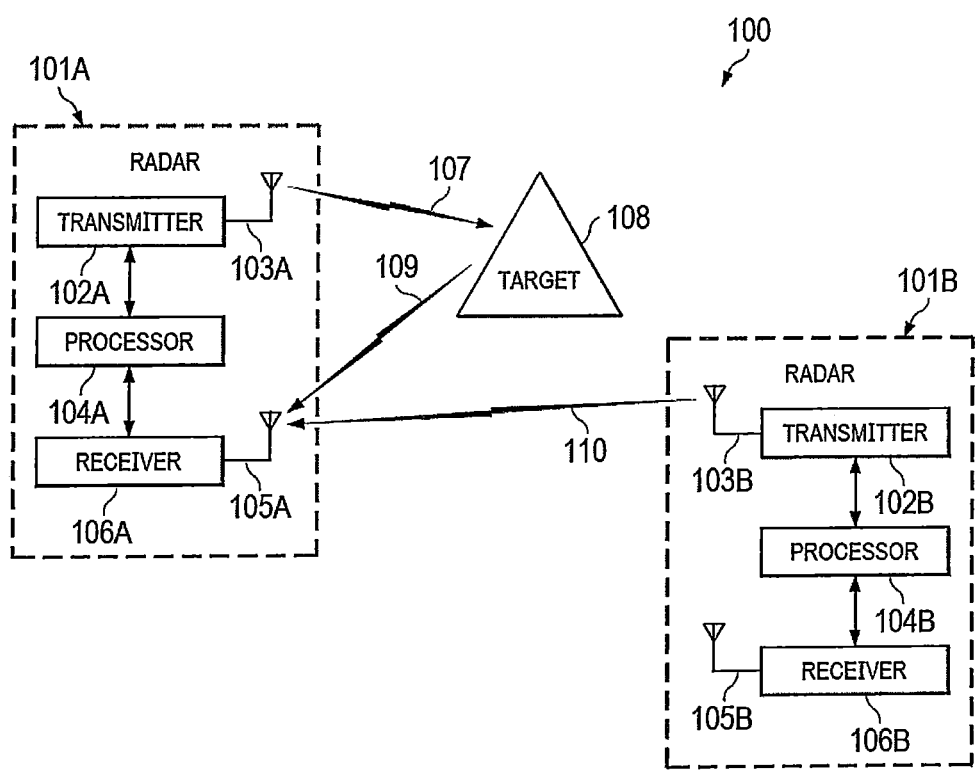
FIG. 1 shows an example of a Frequency-Modulated Continuous-Wave (FMCW) radar system where techniques for mitigating interference using an Autoregressive Moving Average (ARMA) model may be implemented, according to various embodiments.

FIG. 1 shows an example of Frequency-Modulated Continuous-Wave (FMCW) radar system 100 configured to mitigate interference using an ARMA model, according to various embodiments. In some cases, first radar 101A may be coupled to a first motor vehicle, and second radar 101B may be coupled to a second motor vehicle.

First radar 101A includes first radar transmitter(s) (Tx) 102A coupled to first Tx antenna(s) 103A and first radar receiver(s) (Rx) 106A coupled to first Rx antenna(s) 105A, both coupled to first processor 104A (e.g., a microcontroller, a Central Processing Unit or "CPU," a digital signal processor or "DSP," a System-on-Chip or "SoC," etc.). Conversely, second radar 101B includes second radar transmitter(s) (Tx) 102B coupled to second Tx antenna(s) 103B and second radar receiver(s) (Rx) 106B coupled to second Rx antenna(s) 105B, both coupled to second processor 104B.

During the operation of first radar 101A, first radar signal 107 is transmitted by first Tx 102A and reflects off target object 108. First Rx 106A detects reflected signal 109 and first processor 104A processes reflected signal 109 to ascertain a distance to, or a position, speed, or acceleration of target object 108. Moreover, during the operation of second radar 101B, second Tx 102B may transmit second radar signal 110 and at least a portion of second radar signal 110 may reach first receiver 106A of first radar 101A. When first Rx 106A detects reflected signal 109, second radar signal 110 is mixed in as interference, which can prevent first radar 101A from detecting target object 108 or properly estimating its position, range, velocity, etc.

In first radar 101A, after down-conversion (the conversion of a digitized, band-limited signal to a lower frequency signal at a lower sampling rate), the signal of interest (e.g., reflected signal 109) comprises a discrete number of sinusoids, whereas the interference (e.g., second radar signal 110) is a linear chirp of relatively short duration with a frequency sweep from −Fs/2 to Fs/2 for an In-Phase and Quadrature (IQ) sampling receiver, where Fs is the sampling rate used by first processor 104A (after decimation).

The beat frequency for coherently received signals (e.g., reflected signal 109) is:

$$\frac{d\varphi_{Signal}}{dt} = \frac{B}{T}\frac{2r(t)}{G}$$

And the interference signal (e.g., second radar signal 110) may be defined by its frequency slope:

$$\frac{d^2\varphi_{Interference}}{dt^2} = \left(\frac{B}{T} - \frac{B_i}{T_i}\right)$$

where B and $B_i$ are the bandwidths of the transmitted chirp and of the interference, and T, and $T_i$ are the durations of the transmitted chirp and of the interference, respectively.

Furthermore, the interference signal (e.g., second radar signal 110) is in line of sight, and its power follows the equation:

$$P_{Rx,interference} = \frac{P_{Tx}}{4\pi r^2}\frac{G_{Tx}}{L}\frac{G_{Rx}\lambda^2}{4\pi}$$

where $P_{Rx}$ is the received power, $P_{Tx}$ is the transmitted power, $G_{Tx}$ is the Tx antenna gain, $G_{Rx}$ is the RX antenna gain (in the direction of arrival), $\lambda$ is the wavelength, L is propagation loss, and r is the range between the two radar systems 101A and 101B. As such, the power of the received signal is given by:

$$P_{Rx,signal} = \frac{P_{Tx}}{4\pi r^2}\frac{G_{Tx}}{L}\frac{\sigma}{4\pi r^2}\frac{G_{Rx}\lambda^2}{4\pi}$$

where $\sigma$ is the radar cross-section (RCS) of target object 108.

After range compression, the beat signal (e.g., reflected signal 109) is compressed into a single sample, while the interference (e.g., second radar signal 110) is spread out among all frequency bins, acting as an artificially increased noise floor.

Figure 2A:
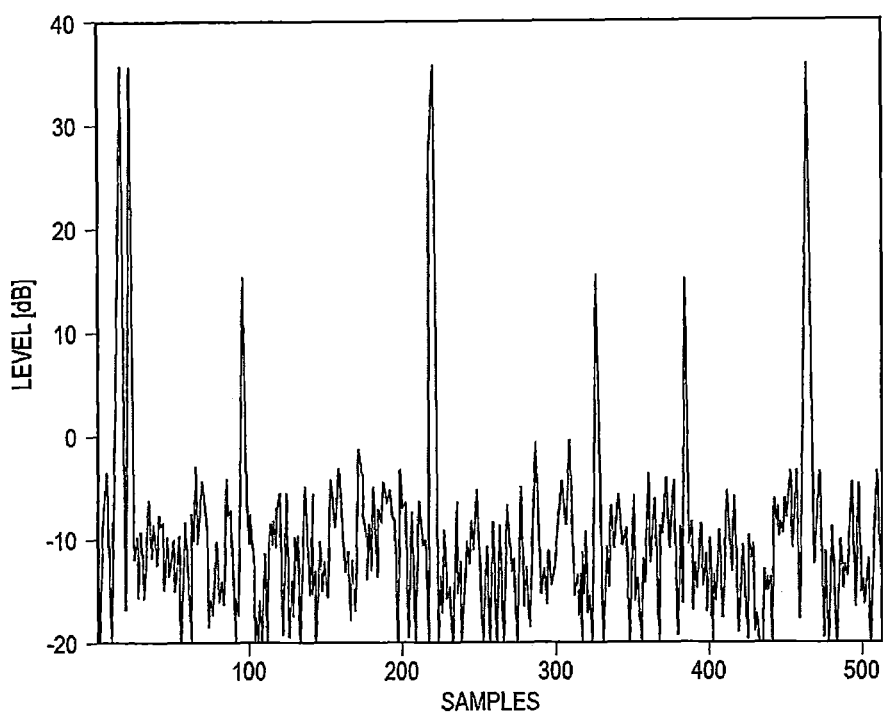
FIGS. 2A-D show graphs of examples of range profiles: without interference, with interference, with zeroed samples, and with reconstructed samples, according to various embodiments.
Figure 2B:
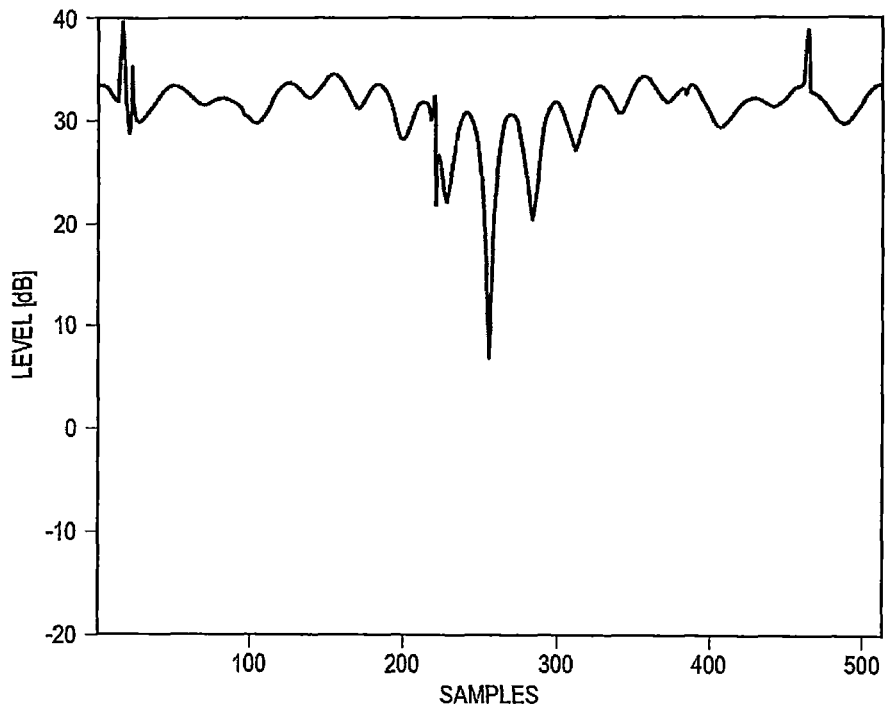

To illustrate the effect of interference in the detected radar signal, FIGS. 2A-D show graphs of examples of range profiles: without interference, with interference, with zeroed samples, and with reconstructed samples, according to various embodiments. Particularly, in FIG. 2A, range profile 200A shows radar samples received without any interference. FIG. 2B shows range profile 200B with the effect of interference, such that the lobes previously seen in range profile 200A are now missing due to an elevated noise floor.

Figure 2C:
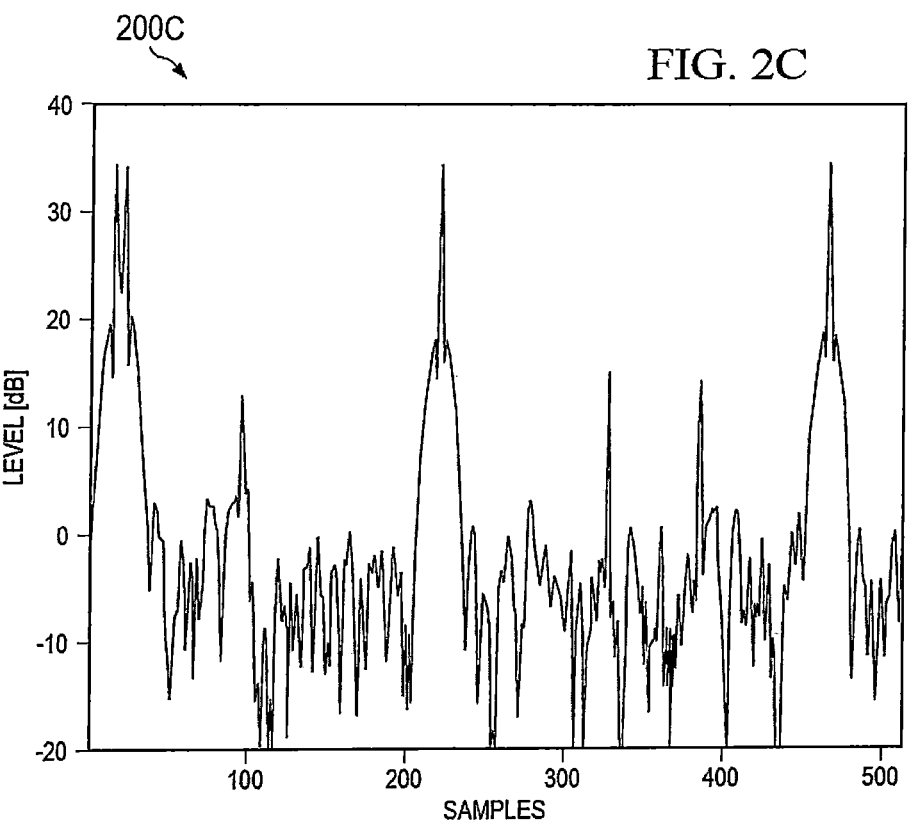
Figure 2D:
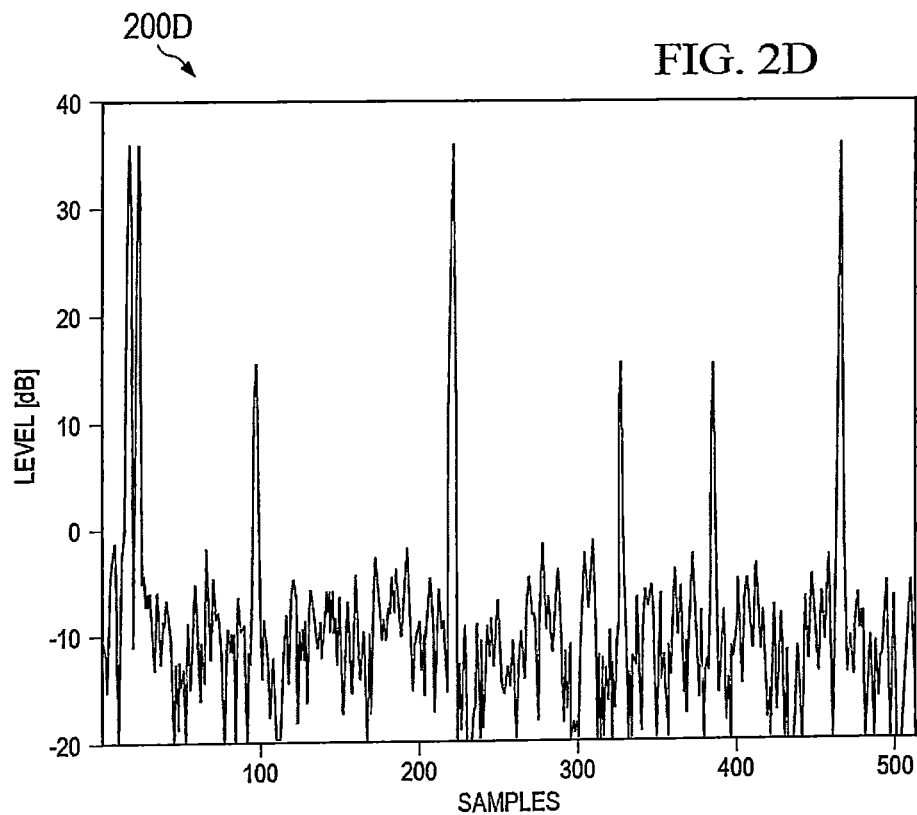

To mitigate the effects of interference, range profile 200C of FIG. 2C shows radar samples with the interference signal removed by "zeroing" them. It should be noted that range profile 200C resembles range profile 200B, but that in range profile 200C each lobe has artifacts (e.g., each lobe is surrounded by side lobes on both sides). Using systems and methods described herein, FIG. 2D shows range profile 200D with radar samples first removed (by zeroing them), and then reconstructed using an ARMA model, as described in more detail below. Upon reconstruction, the lobes of range profile 200D are identical to those of range profile 200A, without the artifacts of range profile 200C.

To further illustrate problems due to the zeroing of samples, FIGS. 3A and 3B show a relationship between a timed-domain signal 300AA with zeroed samples and a corresponding range profile 300B. In this example, there are 18 targets or 36 spectral peaks, with −10 dB time-domain SNR relative to the smallest target, and 24 peaks are being reconstructed. Particularly, in FIG. 3A $p_m(t)$ signal 300AB modulates signal 300AA using an On-Off Keying (OOK) scheme to remove samples affected by interference. Then, in FIG. 3B, the resulting range profile 300B shows $p_m(\omega)$ convolved with the received signal spectrum, such that each beat frequency acts like a carrier frequency.

Figure 4:
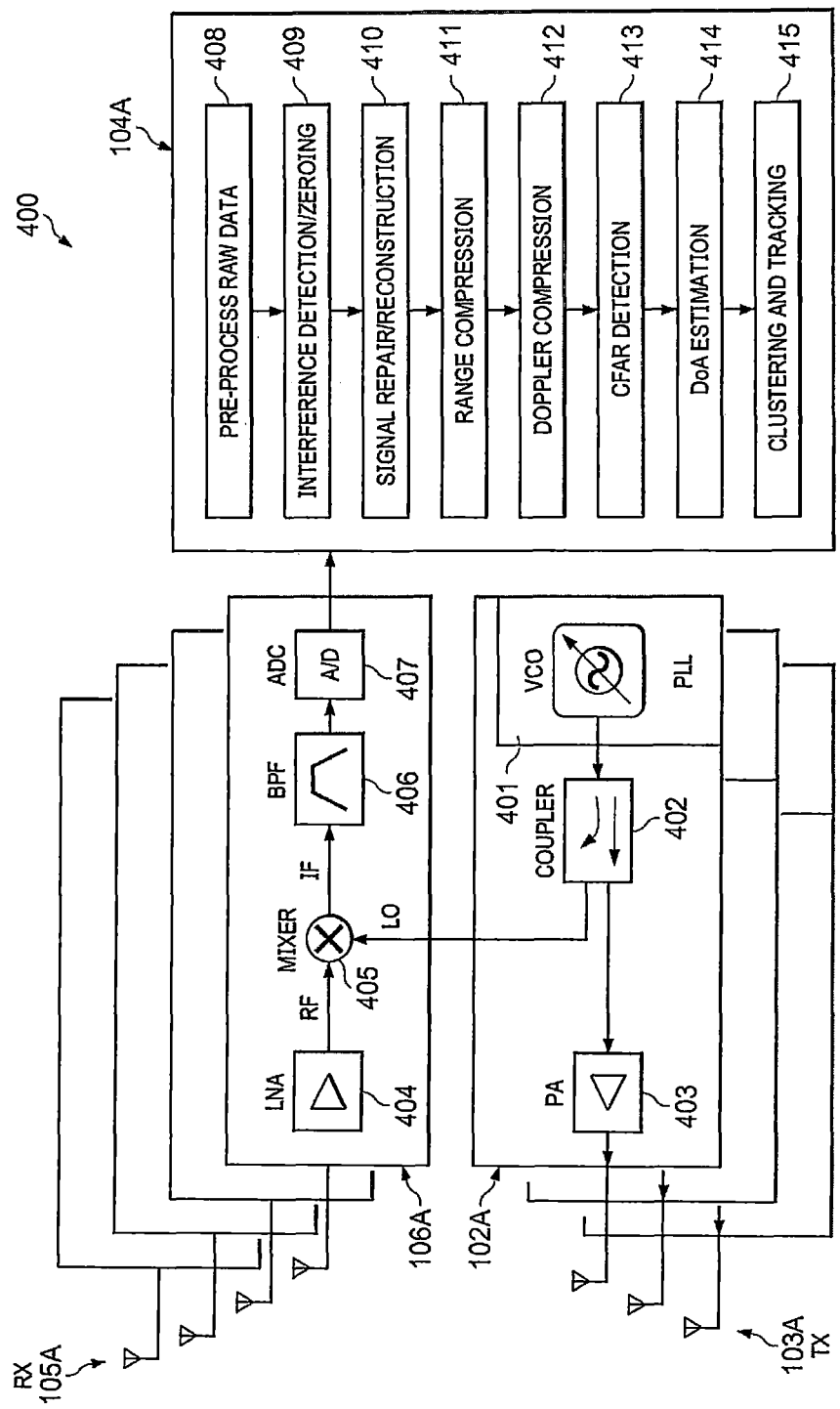
FIG. 4 shows an example of a radar system where techniques for mitigating interference using an ARMA model may be implemented, according to various embodiments.

FIG. 4 shows an example of radar system 400 configured to mitigate interference using an ARMA model, according to various embodiments. Radar system 400 includes transmitters (Tx) 102A coupled to Tx antennas 103A and receivers (Rx) 106A coupled to Rx antennas 105A. Control circuit 401 uses a Phase-locked loop (PLL) to control the output of a Voltage Controller Oscillator (VCO). The output of the VCO is provided to power amplifier (PA) 403 after passing through coupler 402. The output of PA 403 is provided to Tx antennas 103A.

In receiver 106A, an output from coupler 402 reaches mixer 405. Radio frequency (RF) signals detected through Rx antennas 105A are processed by low noise amplifier (LNA) 404 and reach mixer 405 for down conversion into intermediate frequency (IF) signals. Mixer 405 is coupled to bandpass filter (BPF) 406, and BPF 406 is coupled to analog-to-digital converter (ADC) 407. The digital signal output by ADC 407 is then processed by processor 104A to perform selected operations, including interference mitigation operations.

At 408, processor 104A processes raw data from ADC 407. At 409 and 410, interference mitigation operations are performed; namely, at 409 processor 104A zeroes out samples affected by interference, and at 410 processor 104A performs a signal repair or reconstruction of the zeroed samples using an ARMA model. At 411, processor 104A performs range compression, followed by doppler compression at 412, constant false alarm rate (CFAR) detection 413, Direction of Arrival (DoA) estimation 414, and clustering and tracking of targets 415 (e.g., target object 108 in FIG. 1).

With respect to the interference mitigation operations of processor 104A, at 409 processor 104A may detect samples affected by interference in a domain in which the interference signal occupies a minimal number of samples, such as time-domain, STFT, or wavelet. Still at 409, processor 104A may eliminate the samples affected by interference, generally by setting the values to zero. Then, at 410, processor 104A may reconstruct the samples that have been zeroed out using information from a previous one or more frames or from remaining neighboring samples. In various embodiments, systems and methods described herein are directed to 410, where an ARMA model is used to reconstructed zeroed out samples.

Figure 5:
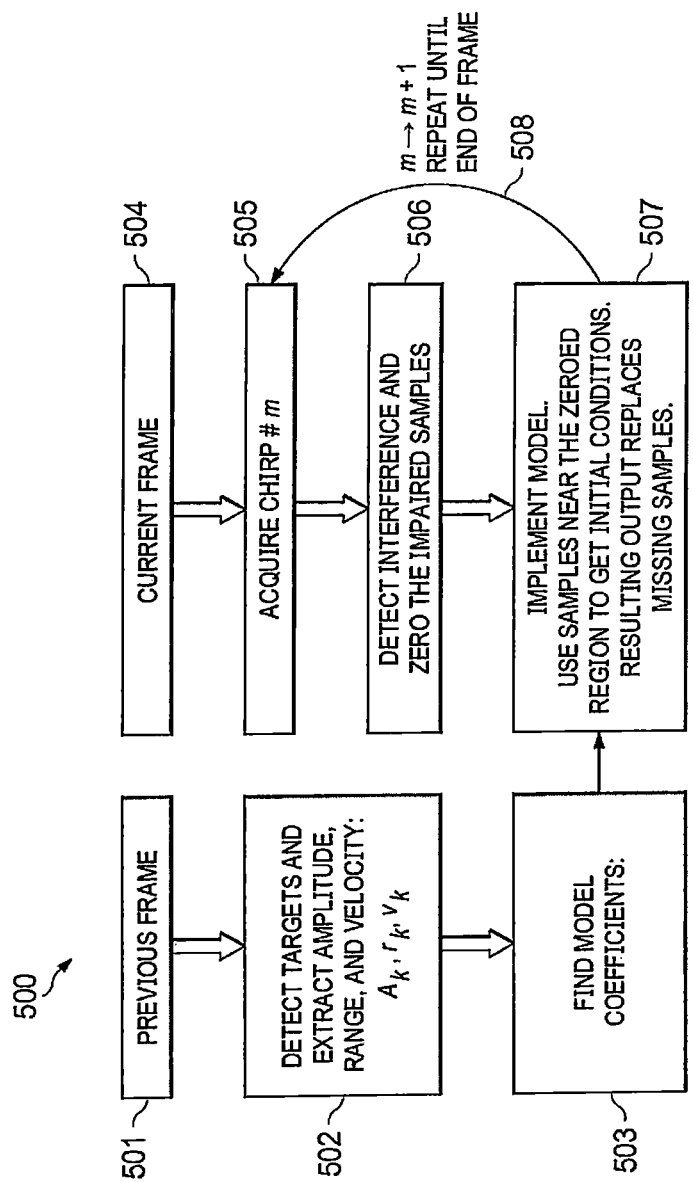
FIG. 5 shows an example of a method for mitigating interference using an ARMA model, according to various embodiments.

FIG. 5 shows an example of method 500 for mitigating interference using an ARMA model. In various embodiments, method 500 may be performed through the execution of program instructions by processor 104A. Specifically, operation 506 corresponds to 409 and operation 507 corresponds to 410 in FIG. 4.

At 501, method 500 receives preceding one or more frames. Each radar frame may include a plurality (m) of chirps or pulses. At 502, method 500 detects a plurality (k) of targets and extracts their amplitudes, ranges, and velocities ($A_k$, $r_k$, and $v_k$) based upon the preceding one or more frames. Then, at 503, method 500 calculates ARMA model coefficients, also based upon the preceding one or more frames.

At 504, method 500 receives a current frame. At 505, method 500 acquires chirp m. At 506, method 500 detects interference and zeroes the impaired samples. Then, at 507, method 500 implements the ARMA model using samples near the zeroed region to get initial conditions and the coefficients of 503 to replace the zeroed out or missing samples. At 508, operations 505-507 may be repeated for the next chirp in the frame, until the end of the frame, and then for each subsequent frame.

As such, method 500 re-uses the amplitude, range, and velocity information for each of the K targets from previous frame(s). Based on the target parameters, an ARMA model is generated to reconstruct the missing samples which have been zeroed out in the detection operation.

It should be noted that conventional methods do not use information from previous frames in a manner that it would be useful for signal reconstruction. Instead, conventional methods estimate an AR model for each chirp, which creates two major issues. First, for multiple targets, the AR model is only an approximation. Second, when using AR model to approximate ARMA model, a large order must be precisely estimated, which is computationally expensive.

The signal model of FMCW monostatic radar beat signal is given by:

$$s_{b,k}(t) = \exp\left(2\pi j\left(\frac{B}{T_c}\frac{2}{c}r_k(t)t - \frac{1}{2}\frac{B}{T_c}\left(\frac{2}{c}r_k(t)\right)^2 - \frac{2}{\lambda}r_k(t)\right)\right)$$

where $T_c$ is the chirp duration, B is the chirp bandwidth, C is the speed of light, $\lambda$ is the wavelength, t is continuous time, and $r_k$ is the range of the k'th target.

In contrast with conventional methods, the ARMA model used herein approximates the true signal model, which is a very slow varying chirp rather than a sinewave, due to range-migration. In practice, however, range migration during a single chirp acquisition is negligible in automotive applications and would require ballistic velocities to become noticeable. Therefore, approximation errors are also negligible, and the frequency is each chirp may be considered constant. The ARMA model accounts for range migration on a chirp-to-chirp basis within a frame, and the impact of phase shift is negligible.

The frequency component for each target signature is given by:

$$\omega_k(m) = 2\pi\left(\frac{2}{c}\frac{B}{T_c}(r_k + v_k T_c m + v_k T_h)\right)\frac{1}{f_s}$$

where m is the chirp number of the current frame, $T_h$ is the hold period between frames, $f_s$ is the sampling rate, and $v_k$ is the target's radial velocity. This frequency component vector is calculated at the end of each frame to be used in the next frame.

Systems and methods described herein also provide a closed form relation between the DSP-implemented infinite impulse response (IIR) filter reconstruction parameters describing the desired ARMA model, and the signal's discrete spectral components. Spectral components are estimated from the previous frame using amplitude, range, and doppler information.

Figure 6:
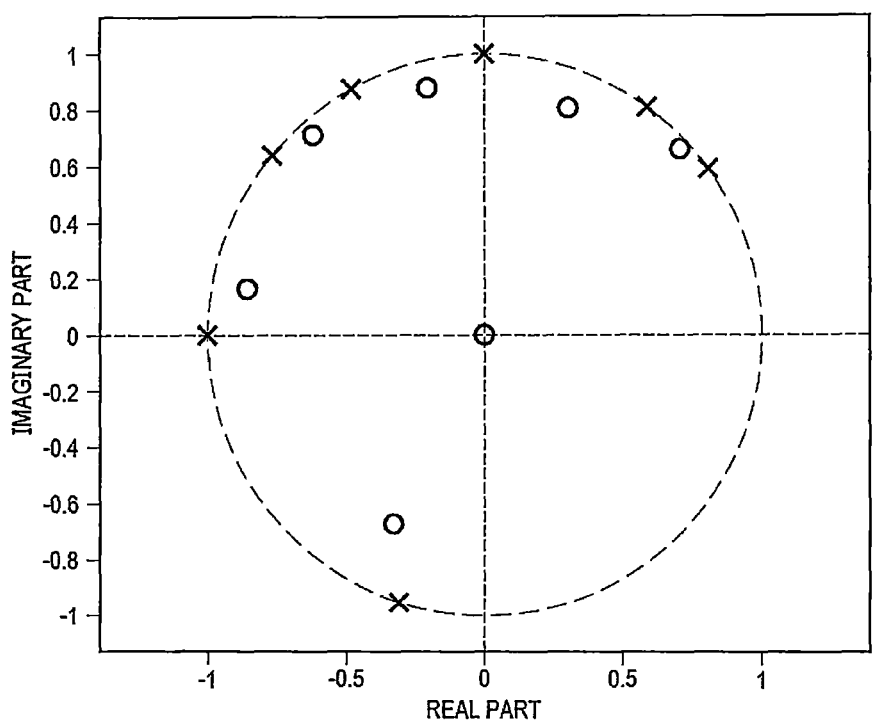
FIG. 6 shows an example of a pole-zero representation for an ARMA model, according to various embodiments.

FIG. 6 shows an example of a pole-zero representation 600 for an ARMA model, according to various embodiments. In this example, a seven-target case is shown where poles are represented by "x," and zeros by "o". When setting up the method, input 501 in FIG. 5A is set to 0, and the resonators are loaded with initial conditions generated from previous samples, resulting in a stable output whose frequency, phase, and amplitude match the missing samples of target signatures that have been zeroed out, without noise or interference.

As such, the ARMA model may be used to regenerate the missing samples. The phase and amplitude information are preserved by the initial conditions of the oscillator. The initial conditions are computed from existing samples that neighbor the missing samples.

For signal reconstruction, one may not use each individual $H_k(z)$ by way of superposition. To apply superposition theorem, the available signal is first spectrally decomposed such that each filter $H_k(z)$ is loaded with initial conditions of the respective spectral component $e^{j\omega_k}$. This is not practical, however, because often we only have access to the sum of the spectral components. Hence, we may use $H(z) = \Sigma_{k=1}^{K} H_k(z)$ for reconstruction purposes, and the remaining issue is designing H(z) in real-time.

The available information from prior frame 401 is the frequency components $\omega_k$ and the residues $A_k$. The goal is to find the IIR filter coefficients, $b_k$ and $a_k$. For signal reconstruction purpose, we may normalize all residues to the value of the largest residue. Because the initial conditions loaded into the filter contain phase and amplitude information, the model H(z) only requires relative amplitudes of the targets. Moreover, to simplify numerical problems of closely spaced targets (e.g., nearly same range, but separable in velocity/angle), one may use the output of a clustering algorithm as an input to the model.

$$H(z) = \frac{1}{\max(A)} \sum_{k=1}^{K} \frac{A_k}{1 - e^{j\omega_k} z^{-1}}$$

The first step is to bring H (z) to a common denominator:

Coefficients of $z^{-k}$ in the nominator are the filter coefficients $b_k$ and the coefficients of $z^{-k}$ in the denominator are the model coefficients $a_k$, and $a_0=1$.

In conventional approaches, where an AR model (poles only) is use instead, $H_{AR}(z)$, differs from the ARMA model, where H(z). Specifically, in an AR model:

$$H_{AR}(z) = \frac{A_{AR}}{\prod_{k=1}^{K} (1 - e^{j\omega_k} z^{-1})} \neq H(z)$$

That is, the AR model is incomplete as it is missing the "zeros" information. Also, conventional model estimation is based on the Burg method or Yule-Walker equations, which require high SNR and perform poorly before Range-Doppler-Angle compression. In contrast, an ARMA model as described herein is estimated from previous frame after Range-Doppler-Angle compression, which results in large SNR and better model estimation. Moreover, from an implementation perspective, the ARMA model described herein only requires addition and multiplication, whereas the Burg method requires auto-correlation matrix inversion less suitable for fixed point arithmetic generally used by processor 104A.

In practice, the proposed method is faster than conventional methods, because the Burg method does not have a priori information regarding the number of targets or optimal order, and must find a solution for all existing targets, whereas the techniques described herein only uses a set of targets that have high SNR.

With respect to the ARMA model described herein, to obtain the IIR coefficients, we may equate the desired filter with the IIR form:

$$\frac{\sum_{k=1}^{K} \left( A_k \prod_{p \neq k}^{K} (1 - e^{j\omega_p} z^{-1}) \right)}{\prod_{k=1}^{K} (1 - e^{j\omega_k} z^{-1})} = \frac{\sum_{k=0}^{K-1} b_k z^{-k}}{1 - \sum_{k=1}^{K} a_k z^{-k}}$$

This is equivalent to equating the nominators and denominators:

$$\Sigma_{k=0}^{K-1} b_k z^{-k} = \Sigma_{k=1}^{K-1}(A_k \Pi_{p \neq k}^{K}(1 - e^{j\omega_p} z^{-1})), \text{ or}$$

$$1 - \Sigma_{k=1}^{K} a_k z^{-k} = \Pi_{k=1}^{K}(1 - e^{j\omega_k} z^{-1})$$

A solution may be obtained by associating the polynomial coefficients corresponding to the same order. This is similar to mapping the polynomial as a vector space and associated the terms whose dot product is not in the null space. An example is shown in Table 1 for all a and b coefficients of the ARMA model for 1, 2, and 3 targets:

TABLE 1

| Input Signal | IIR Filter Coefficients |
|---|---|
| Single Tone:<br>$s(t) = A_1 e^{jw1t}$ | $b_0 = A_1$<br>$a_0 = 1$<br>$a_1 = -e^{jw1}$ |
| Two-tone:<br>$s(t) = A_1 e^{jw1t} + A_2 e^{jw2t}$ | $b_0 = A_1 + A_2$<br>$b_1 = -A_1 e^{jw2} - A_2 e^{jw1}$<br>$a_0 = 1$<br>$a_1 = -e^{jw1} - e^{jw2}$<br>$a_2 = e^{jw1} e^{jw2}$ |
| Three-tone:<br>$s(t) = A_1 e^{jw1t} + A_2 e^{jw2t} + A_3 e^{jw3t}$ | $b_0 = A_1 + A_2 + A_3$<br>$b_1 = -A_1(e^{jw2} + e^{jw3}) - A_2(e^{jw1} + e^{jw3}) - A_3(e^{jw1} + e^{jw2})$<br>$b_2 = A_1 e^{jw2} e^{jw3} + A_2 e^{jw1} e^{jw3} + A_3 e^{jw1} e^{jw2}$<br>$a_0 = 1$<br>$a_1 = -e^{jw1} - e^{jw2} - e^{jw3}$<br>$a_2 = e^{jw1} e^{jw2} + e^{jw2} e^{jw3} + e^{jw1} e^{jw3}$<br>$a_3 = -e^{jw1} e^{jw2} e^{jw3}$ |

Computing coefficients by a brute approach can result in factorial complexity. To address this, an iterative method may be used for estimating the coefficients in polynomial $O(K^2)$ time. The recursive equations are presented in Table 2, for both the a and b coefficients. The recursion is based on the recursive property of the binomial expansion: $C_k^n = C_{k-1}^{n-1} + C_k^{n-1}$.

TABLE 2

| Poles | $a_{0,1;K} = 1$ |
|---|---|
| | $a_{k,K} = a_{k,K-1} - a_{k-1,K-1} e^{jw_K}$ |
| | $a_{K,K} = -a_{K-1,K-1} e^{jw_K}$ |
| Zeros | $b_{0,K} = A_K a_{0,K-1} + b_{0,K-1}$ |
| | $b_{k,K} = A_K a_{k,K-1} + b_{k,K-1} - b_{k-2,K-1} e^{jw_{k+1}}$ |
| | $b_{K-1,K} = A_K a_{K-1,K-1} - b_{K-2,K-1} e^{jw_K}$ |

In Table 2 above, $a_{i,j}$ is the i'th nominator coefficient for an ARMA model of order j, and $b_{i,j}$ is the i'th denominator coefficient for an ARMA model of order j.

In Table 3, double indexing is used to adapt the example of Table 1, as follows:

TABLE 3

| Input Signal | IIR Filter Coefficients |
| --- | --- |
| Single Tone:<br>$s(t) = A_1 e^{jw_1 t}$ | $b_{0,1} = A_1$<br>$a_{0,1} = 1$<br>$a_{1,1} = -e^{jw_1}$ |
| Two-tone:<br>$s(t) = A_1 e^{jw_1 t} + A_2 e^{jw_2 t}$ | $b_{0,2} = A_1 + A_2$<br>$b_{1,2} = -A_1 e^{jw_2} - A_2 e^{jw_1}$<br>$a_{0,2} = 1$<br>$a_{1,2} = -e^{jw_1} - e^{jw_2}$<br>$a_{2,2} = e^{jw_1} e^{jw_2}$ |
| Three-tone:<br>$s(t) = A_1 e^{jw_1 t} + A_2 e^{jw_2 t} + A_3 e^{jw_3 t}$ | $b_{0,3} = A_1 + A_2 + A_3$<br>$b_{1,3} = -A_1(e^{jw_2} + e^{jw_3}) - A_2(e^{jw_1} + e^{jw_3}) - A_3(e^{jw_1} + e^{jw_2})$<br>$b_{2,3} = A_1 e^{jw_2} e^{jw_3} + A_2 e^{jw_1} e^{jw_3} + A_3 e^{jw_1} e^{jw_2}$<br>$a_{0,3} = 1$<br>$a_{1,3} = -e^{jw_1} - e^{jw_2} - e^{jw_3}$<br>$a_{2,3} = e^{jw_1} e^{jw_2} + e^{jw_2} e^{jw_3} + e^{jw_1} e^{jw_3}$<br>$a_{3,3} = -e^{jw_1} e^{jw_2} e^{jw_3}$ |

Figure 7A:
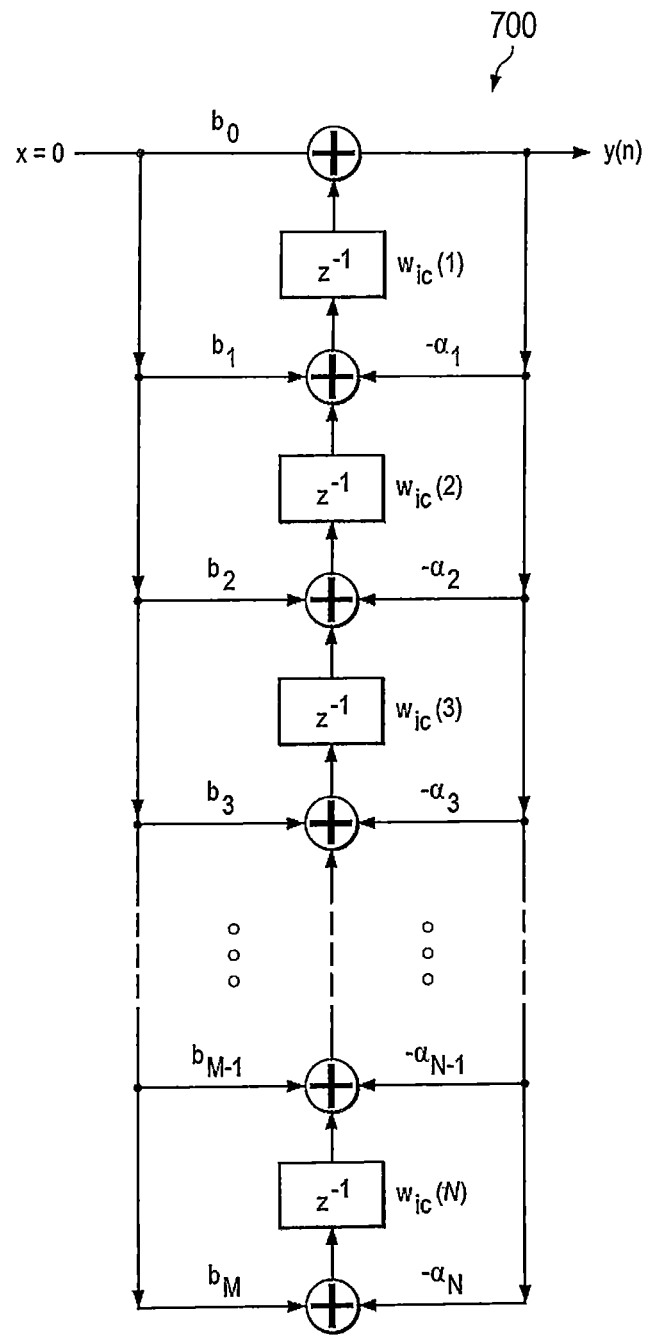

FIGS. 7A and 7B show example implementation 700 of an extrapolation method for an ARMA model. In some embodiments, method 700 may use AR component and y loading:

$$y(n) = \Sigma_{k=1}^{N} a_k y(n-k) + \Sigma_{k=0}^{N} b_k x(n-k)$$

Where $y_{K-N+1}$ and $y_K$ are shown in graph 701 of a time domain radar signal. In method 700, input x is equal to zero such that $b_k$ coefficients are not used. As a result, $w_{ic}(n) = a_{1:N} * y_{K:K-N+1}$.

Figure 8:
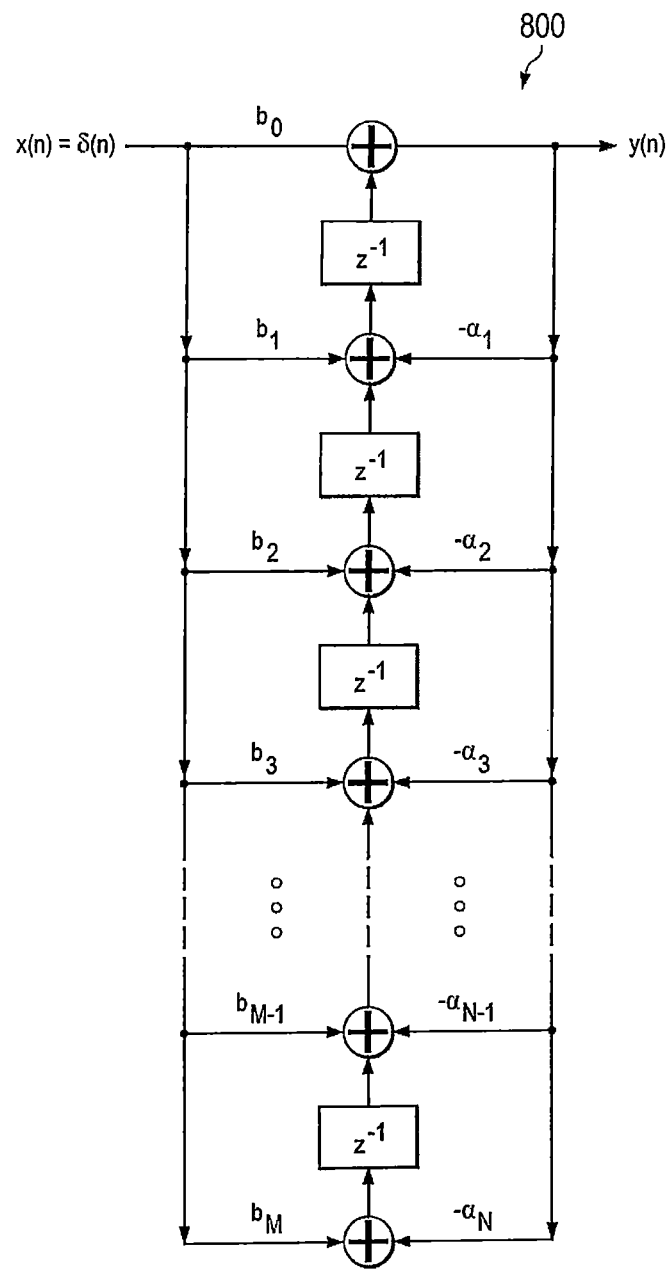
FIG. 8 shows an example implementation of a regeneration method for an ARMA model, according to various embodiments.

FIG. 8 show example implementation 800 of a regeneration method for an ARMA model, where $x(n) = \delta(n)$. In various embodiments, the regeneration method may be executed follows: First, $\omega_k$ and $|A_k|$ may be estimated from previous frame detections. Then, $Y_{zero}(e^{j\omega}) = DFT\{y_{zero}(n)\}$ may be calculated using a reduced dictionary $e^{j\omega_k n}$. The phase $\varphi$ of $A_k$ may be estimated from $Y_{zero}(e^{j\omega})$ at each frequency $e^{j\omega_k}$. Coefficients b and a may then be estimated from $\omega_k$ and $|A_k| e^{j\varphi}$. The impulse response function is given by $h(n) = (b, a, \delta(n))$, where $\delta(n)$ is the discrete delta Dirac function. Finally, h(n) samples are used to replace missing samples from $y_{zero}(n)$. Alternatively, the regeneration method may also be implemented in a similar manner to how Orthogonal Frequency-Division Multiplexing (OFDM) is used in communications, such that we can generate $h(n) = ifft\{H(e^{j\omega})\}$, where $H(e^{j\omega})$ is formed by placing the complex valued components $A_k$ at frequencies $\omega_k$.

To illustrate the operation of these systems and methods, the following simulated use-case are provided. System specifications for this use-case are shown in Table 4:

TABLE 4

| | |
| --- | --- |
| Bandwidth | 300 MHz |
| Chirp Duration | 25.6 us |
| PRI | 30 us |
| Sampling Frequency | 20 MHz |
| Number of Chirps | 512 |
| Wavelength | 3.9 mm |
| Interference #1 Bandwidth | 100 MHz |
| Interference #1 PRI | 24 us |
| Interference #2 Bandwidth | 200 MHz |
| Interference #2 PRI | 150 us |

Table 5 below shows target-related information of the use-case, which presents 40 targets with different ranges. Within each of the range bins, multiple targets may be present at other Doppler or angle locations. There are up to two interference signatures in every chirp, which affect up to 9 samples. In this use-case, targets used to construct the ARMA model are: 6, 19, 25, 29, 34, and 39 (other targets are ignored).

TABLE 5

| Target # | Range | Velocity | Amplitude |
| --- | --- | --- | --- |
| 1 | 1 | −16 | 1 |
| 2 | 4 | −12 | 1 |
| 3 | 7 | −8 | 1 |
| 4 | 10 | −4 | 1 |
| 5 | 13 | 0 | 1 |
| 6 | 16 | 4 | 40 |
| 7 | 19 | 8 | 1 |
| 8 | 22 | 12 | 1 |
| 9 | 25 | 16 | 1 |
| 10 | 28 | 20 | 1 |
| 11 | 31 | 20 | 1 |
| 12 | 34 | 16 | 1 |
| 13 | 37 | 12 | 1 |
| 14 | 40 | 8 | 1 |
| 15 | 43 | 4 | 1 |
| 16 | 46 | 0 | 1 |
| 17 | 49 | −4 | 1 |
| 18 | 52 | −8 | 1 |
| 19 | 55 | −12 | 20 |
| 20 | 58 | −16 | 1 |
| 21 | 61 | −16 | 1 |
| 22 | 64 | −12 | 1 |
| 23 | 67 | −8 | 1 |
| 24 | 70 | −4 | 1 |
| 25 | 73 | 0 | 20 |
| 26 | 76 | 4 | 1 |
| 27 | 79 | 8 | 1 |
| 28 | 82 | 12 | 1 |
| 29 | 85 | 16 | 20 |
| 30 | 88 | 20 | 1 |
| 31 | 91 | 20 | 1 |
| 32 | 94 | 16 | 1 |
| 33 | 97 | 12 | 1 |
| 34 | 100 | 8 | 20 |
| 35 | 103 | 4 | 1 |
| 36 | 106 | 0 | 1 |
| 37 | 109 | −4 | 1 |
| 38 | 112 | −8 | 1 |
| 39 | 115 | −12 | 20 |
| 40 | 118 | −16 | 1 |

FIGS. 9A-C show graphs of examples of simulation results for the simulated use-case discussed above, according to various embodiments. Specifically, FIG. 9A shows a time domain representation of a received radar signal as curve 900A with target reflections 901.

FIG. 9B shows curves 900B containing a time domain representation of the received signal with interference mitigation (continuous line) and ideal target signatures (dotted line). Interference may be eliminated using an ideal interference detector (i.e., artificially eliminated), such that the proposed method can be evaluated independent of detection performance. In curves 900B, targets 902 have been reconstructed, after being zeroed out, using an ARMA model.

Curves 900C of FIG. 9C illustrate a zoomed-in version of curves 900B, showing a close-up illustration 903 of the leftmost one of targets 902, and containing a time domain representation of the received signal with interference mitigation (continuous line) and ideal target signatures (dotted line). It should be noted that the reconstructed signal matches the ideal signal, even if low SNR components are ignored.

Figure 10A:
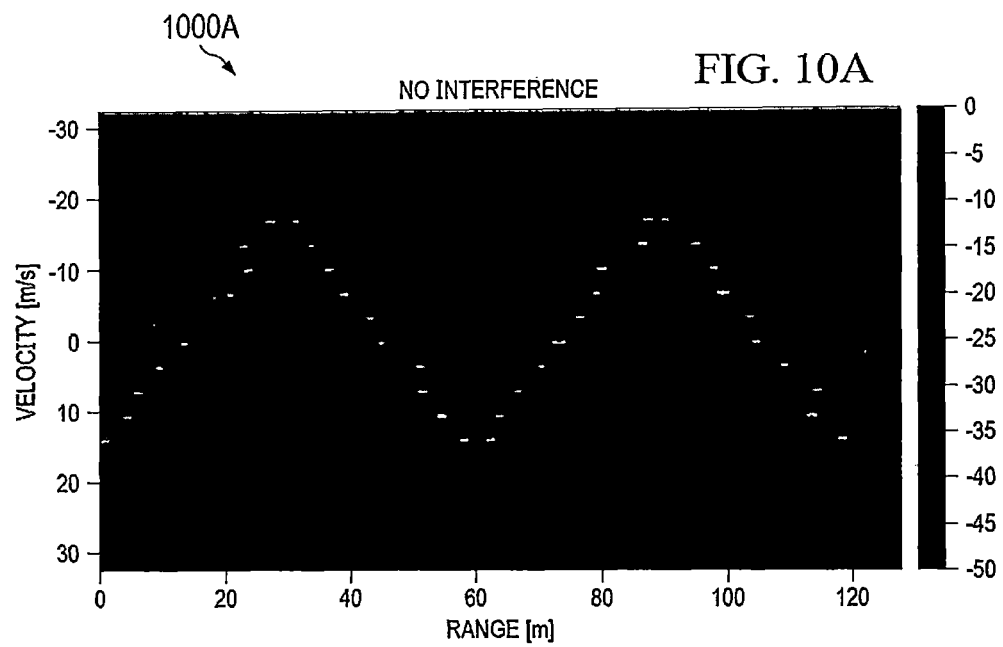
FIGS. 10A-D show examples of range-doppler heat maps: without interference, with interference, with zeroed samples, and with reconstructed samples, according to various embodiments.
Figure 10B:
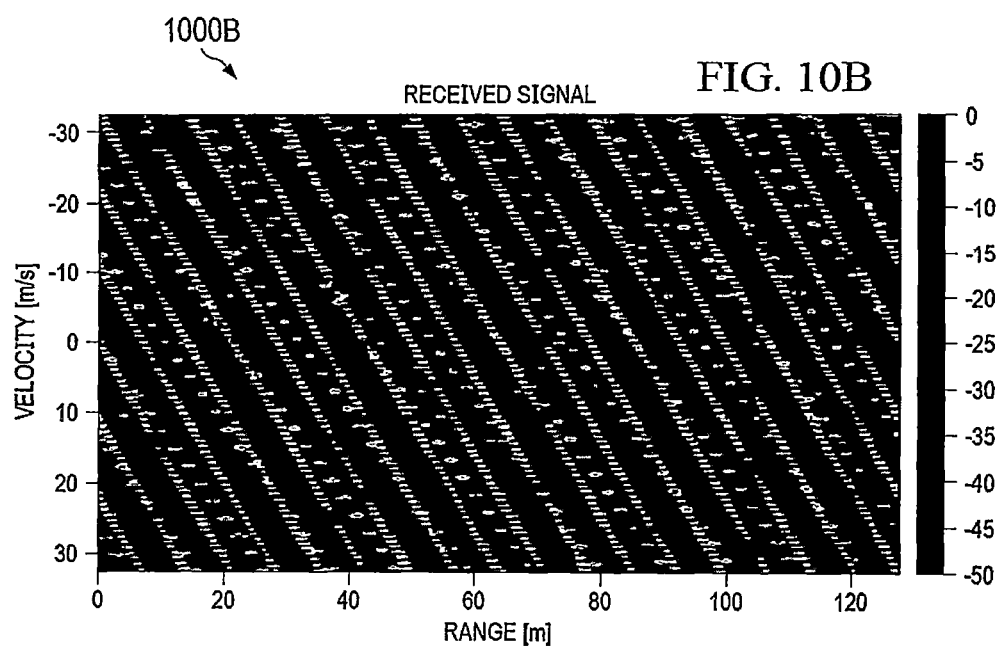
Figure 10C:
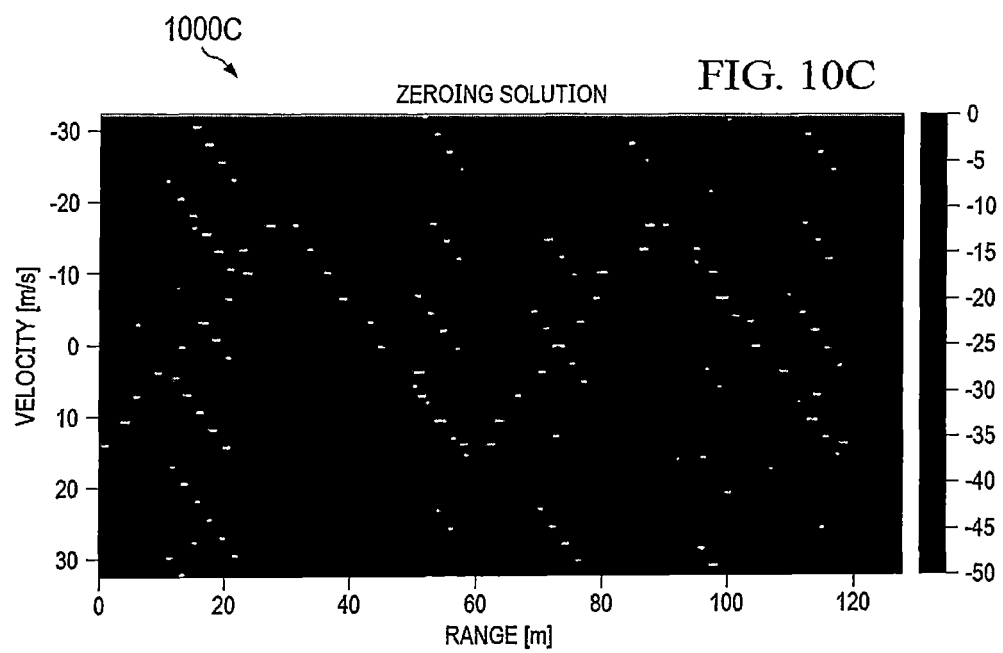
Figure 10D:
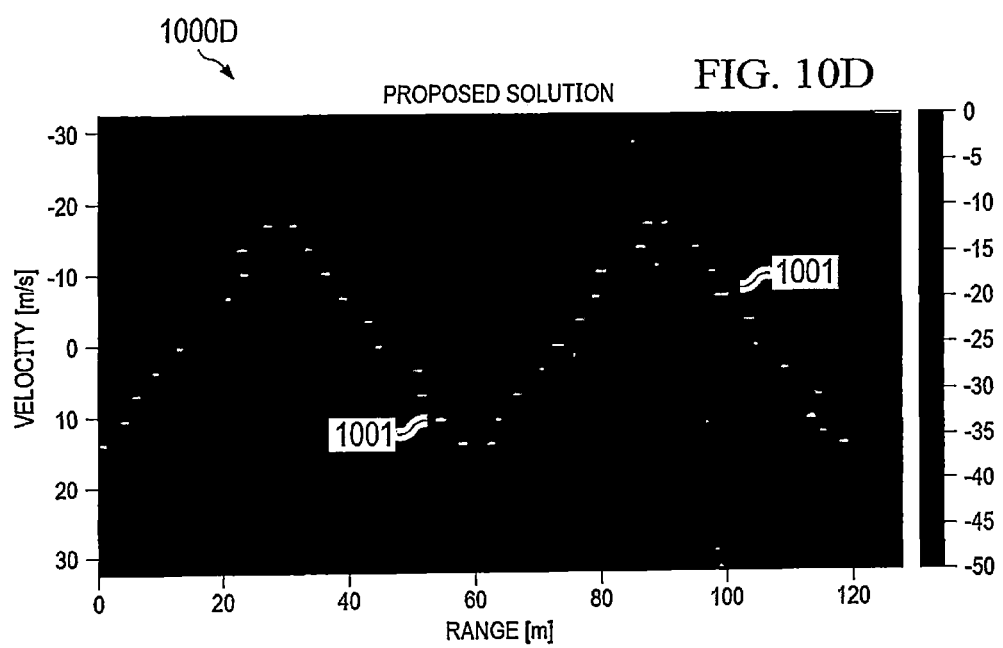

FIGS. 10A-D show examples of range-doppler heat maps for the simulated use-case discussed above, according to various embodiments. FIG. 10A shows heat map 1000A without interference, FIG. 10B shows heat map 1000B with interference, FIG. 10C shows heat map 1000C with zeroed samples, and FIG. 10D shows heat map 1000D with reconstructed samples using method 400. In heat map 1000C, the pattern of spurious peaks generated by the zeroing and interference is caused by the chirp-by-chirp periodicity of the gaps or interference, which is present over the entire radar frame. In contrast, heat map 1000D eliminates spurious lobes caused by the strong target signatures by filling in any gaps (squares 1001 identify the targets that have been included in the model).

As this use-case shows, systems and methods described herein enable signal reconstruction in time-domain based on previous detections after samples affected by interference have been eliminated. These systems and methods also provide signal reconstruction, particularly suitable for automotive applications, by designing an ARMA model in real-time with less numerical computation than conventional methods used to design otherwise incomplete AR models. Using the systems and methods described herein, ARMA model estimation may use a selected number of signatures to improve robustness (e.g., the model may be based on output of clustering algorithm).

Accordingly, systems and methods described herein may use Range-Doppler-Amplitude information from previous frame detections as a mechanism for constructing a model and replaces conventional AR model approximation with an analytical AR or ARMA model (without expensive order estimations). Conventional ARMA model generation requires $O(n^3)$ numerical complexity, where n is the order of the model. In contrast, systems and methods described herein provide a unique solution for FMCW radars that works in polynomial time $O(n^2)$, using only scalar addition and multiplication. Moreover, in these systems and methods, model components may be selected according to amplitude, such that only high SNR targets that produce above-noise-floor spurs are include, and low-SNR targets are exclude, thus improving robustness and performance.

Figure 11:
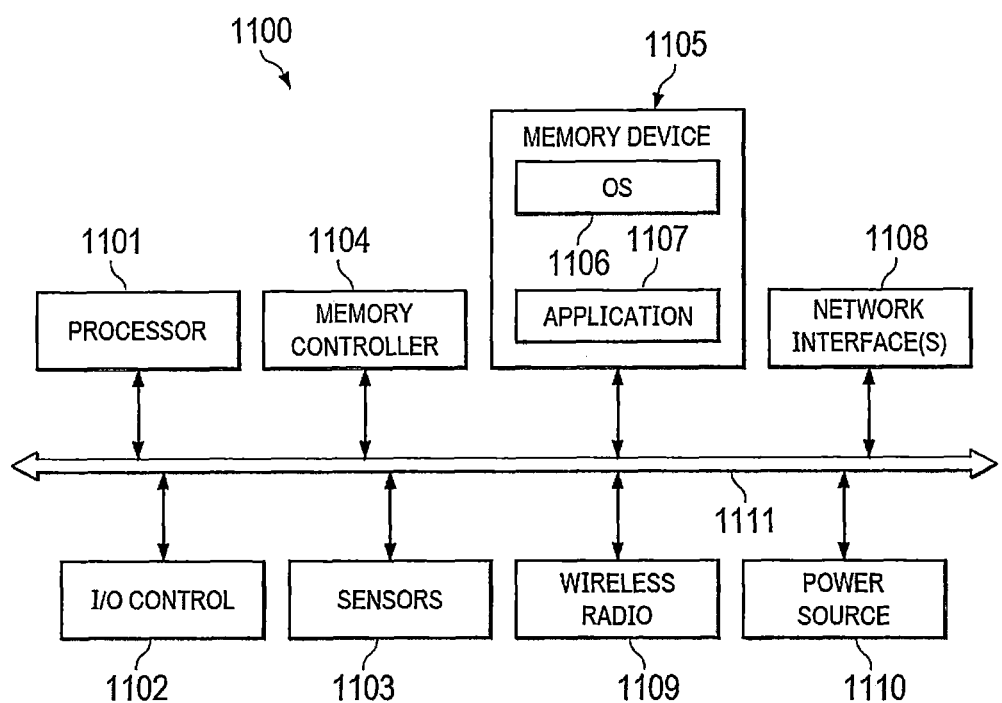
FIG. 11 shows an example of an electronic device having a radar system where techniques for mitigating interference using an ARMA model may be implemented, according to various embodiments.

FIG. 11 shows an example of electronic device 1100 having a radar system where techniques for mitigating interference using an ARMA model may be implemented. In various embodiments, device 1100 may be integrated with electronic circuitry, microprocessors, memory, input output (I/O) logic control, communication interfaces and components, as well as other hardware, firmware, or software to implement initiator device 101 or reflector device 102.

Device 1100 includes processor 1101 (e.g., a controller, a microcontroller, a digital signal processor, etc.) configured to execute program instructions stored in memory device 1105 for implementing various systems and methods described herein. Processor 1101 may include components of an integrated circuit, programmable logic device, a logic device formed using one or more semiconductors, and other implementations in silicon or hardware, such as a processor and memory system implemented as a system-on-chip (SoC).

In some cases, processor 1101 may include two units: (i) a low-power microprocessor, core, or domain, and (ii) a high-power microprocessor, core, or domain. The high-power microprocessor may execute computationally intensive operations, whereas the low-power microprocessor may manage simpler processes, such as detecting inputs from one or more sensors. The low-power processor may also wake or initialize the high-power processor for computationally intensive processes.

In device 1100, data bus 1111 couples its various components and enable data communication between those components. Data bus 1111 may be implemented as any suitable combination of one or more bus structures or bus architectures. Device 1100 also includes power source 1110, such as a battery or an AC-DC power supply.

Sensors 1103 may be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, sensors 1103 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and RF identification (ID) detectors).

Memory controller 1104 and memory device 1105 may implement any type of nonvolatile memory or other suitable electronic storage device. Device 1100 may include various firmware or software, such as Operating System (OS) 1106 maintained as computer executable instructions in memory 1105 and executed by processor 1101. Moreover, application 1107 may include a distance estimation application that implements various aspects of the systems and methods described herein.

Input-output (I/O) control 1102 may be configured to receive input from a user or provide information to the user. For example, I/O control 1102 may also include mechanical or virtual components that respond to a user input. For example, the user can mechanically move a sliding or rotatable component, or the motion along a touchpad may be detected, and may correspond to a setting of device 1100.

Device 1100 includes network interfaces 1108, such as a mesh network interface for communication with other devices in a wireless mesh network, and an external network interface for network communication, such as via the Internet. Wireless radio system 1109 may be used for wireless communication with other devices via network interface 1108 and for multiple, different wireless communications systems. For instance, radio system 1109 may include a radio device, antenna, and chipset implemented for any given wireless communications technology, such as, for example, Wi-Fi, BLUETOOTH, Mobile Broadband, BLE, point-to-point IEEE 802.15.4, etc. Additionally, or alternatively, radio system 1109 may include radar system 300 of FIG. 3.

As such, systems and methods for mitigating interference in FMCW radars using an ARMA model are described. In an illustrative, non-limiting embodiment, a device includes a processor and a memory coupled to the processor, the memory having program instructions stored thereon that, upon execution by the processor, cause the device to: receive a first frame captured by a radar; receive a second frame, captured after the first frame, by the radar; and reconstruct zeroed samples in the second frame with information obtained from the first frame to mitigate interference in the second frame caused by another radar.

Each of the first and second frames may include a plurality of chirps. The radar may include an FMCW radar. The information may include an amplitude, a velocity, and a range associated with at least one target corresponding to a signal containing the zeroed samples. The device may select the target based, at least in part, upon an SNR metric.

The program instructions, upon execution, may cause the device to select the target based, at least in part, upon a power spectrum of the target relative to a total power spectrum of the first frame. The program instructions, upon execution, may also cause the device to select the target based, at least in part, upon a proximity of the target to another target in the first frame. The program instructions, upon execution, may further cause the device to calculate coefficients of an ARMA model configured to reconstruct the zeroed samples into reconstructed samples.

The ARMA model may be configured to implement a regeneration technique. Additionally, or alternatively, an AR section of the ARMA model is configured to implement an extrapolation technique. The reconstructed samples may have a power spectral density that matches a power spectral density a non-interfered received signal.

The program instructions, upon execution, may cause the device to: receive a third frame, captured after the second frame, by the radar; and reconstruct zeroed samples in the third frame with information obtained from the first and second frames to mitigate interference in the third frame caused by the other radar.

In another illustrative, non-limiting embodiment, a memory storage device may have program instructions stored thereon that, upon execution by a processor of a device, cause the device to: receive a first radar frame; receive a second radar frame captured after the first radar frame; remove samples affected by interference from the second radar frame; and replace the removed samples in the second radar frame with reconstructed samples based upon amplitude, velocity, and range information of a target detected in the first radar frame to mitigate the interference.

The program instructions, upon execution, may cause the device to calculate coefficients of an ARMA model configured to reconstruct the removed samples into reconstructed samples. The reconstructed samples may have a power spectral density that matches a power spectral density of the removed samples. The ARMA model may be configured to implement a regeneration technique or an extrapolation technique.

In yet another illustrative, non-limiting embodiment, a method may include: receiving a current radar frame; and replacing samples removed from the radar frame with replacement samples calculated based upon information associated with a target present in a preceding radar frame to mitigate interference in the current radar frame. The information may include an amplitude, a velocity, and a range associated with the target.

In some cases, replacing samples may include calculating coefficients of an ARMA model. The replacement samples may have a power spectral density that matches a power spectral density of the removed samples.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A device, comprising:
    a processor; and
    a memory coupled to the processor, the memory having program instructions stored thereon that, upon execution by the processor, cause the device to:
        receive a first frame captured by a radar system;
        receive a second frame, captured after the first frame, by the radar system; and
        reconstruct zeroed samples in the second frame with information obtained from the first frame to mitigate interference in the second frame caused by another radar system, wherein each of the first and second frames comprises a plurality of chirps.

2. The device of claim 1, wherein the radar system comprises a Frequency-Modulated Continuous-Wave (FMCW) radar system.

3. The device of claim 1, wherein the information comprises an amplitude, a velocity, and a range associated with at least one target corresponding to a signal containing the zeroed samples.

4. The device of claim 3, wherein the program instructions, upon execution, further cause the device to select the target based, at least in part, upon a signal-to-noise ratio (SNR) metric.

5. The device of claim 3, wherein the program instructions, upon execution, further cause the device to select the target based, at least in part, upon a power spectrum of the target relative to a total power spectrum of the first frame.

6. The device of claim 3, wherein the program instructions, upon execution, further cause the device to select the target based, at least in part, upon a proximity of the target to another target in the first frame.

7. The device of claim 3, wherein the program instructions, upon execution, further cause the device to calculate coefficients of an Autoregressive Moving Average (ARMA) model configured to reconstruct the zeroed samples into reconstructed samples.

8. The device of claim 7, wherein the ARMA model is configured to implement a regeneration technique.

9. The device of claim 7, wherein an autoregressive (AR) section of the ARMA model is configured to implement an extrapolation technique.

10. The device of claim 7, wherein the reconstructed samples have a power spectral density that matches a power spectral density of a non-interfered received signal.

11. The device of claim 1, wherein the program instructions, upon execution, further cause the device to:
    receive a third frame, captured after the second frame, by the radar system; and
    reconstruct zeroed samples in the third frame with information obtained from the first and second frames to mitigate interference in the third frame caused by the other radar system.

12. A memory storage device having program instructions stored thereon that, upon execution by a processor of a device, cause the device to:
    receive a first radar frame;
    receive a second radar frame captured after the first radar frame;
    remove samples affected by interference from the second radar frame; and
    replace the removed samples in the second radar frame with reconstructed samples based upon amplitude, velocity, and range information of a target detected in the first radar frame to mitigate the interference, wherein each of the first radar frame and the second radar frame comprises a plurality of chirps.

13. The memory storage device of claim 12, wherein the program instructions, upon execution, further cause the device to calculate coefficients of an Autoregressive Moving Average (ARMA) model configured to reconstruct the removed samples into reconstructed samples.

14. The memory storage device of claim 13, wherein the reconstructed samples have a power spectral density that matches a power spectral density of the removed samples.

15. The memory storage device of claim 13, wherein the ARMA model is configured to implement a regeneration technique or an extrapolation technique.

16. A method, comprising:
    receiving a current radar frame; and
    replacing samples removed from the radar frame with replacement samples calculated based upon information associated with a target present in a preceding radar frame to mitigate interference in the current radar frame, wherein each of the current radar frame and the preceding radar frame comprises a plurality of chirps.

17. The method of claim 16, wherein the information comprises an amplitude, a velocity, and a range associated with the target.

18. The method of claim 16, wherein replacing samples further comprises calculating coefficients of an Autoregressive Moving Average (ARMA) model.

19. The method of claim 16, wherein the replacement samples have a power spectral density that matches a power spectral density of the removed samples.

* * * * *